United States Patent [19]

Ishikawa et al.

[11] Patent Number: 5,529,821
[45] Date of Patent: Jun. 25, 1996

[54] CONTAINER FOR STORING BLOOD OR BLOOD COMPONENT

[75] Inventors: Kenji Ishikawa, Isehara; Shinichi Kora, Hadano; Yoshihiro Yokoo, Isehara; Akira Mochizuki, Hadano; Osami Shinonome, Fujinomiya, all of Japan

[73] Assignee: Terumo Kabushiki Kaisha, Tokyo, Japan

[21] Appl. No.: 368,354

[22] Filed: Jan. 4, 1995

Related U.S. Application Data

[63] Continuation-in-part of Ser. No. 83,290, Jun. 29, 1993, abandoned.

[30] Foreign Application Priority Data

Jun. 29, 1992 [JP] Japan .................... 4-171027

[51] Int. Cl.⁶ .................. C08L 53/02; C08L 23/10
[52] U.S. Cl. .................. 428/36.91; 428/34.1; 428/35.7; 428/500; 428/424.2; 428/476.3; 428/483; 525/240
[58] Field of Search ............... 428/34.1, 35.7, 428/36.91, 462, 500, 423.1, 424.2, 474.4, 476.3, 480, 483; 525/240

[56] References Cited

U.S. PATENT DOCUMENTS

| | | | |
|---|---|---|---|
| 3,830,767 | 8/1974 | Condon | 260/28.5 |
| 3,865,776 | 2/1975 | Gergen | 260/33.6 AQ |
| 4,140,162 | 2/1979 | Gajewski et al. | 150/1 |
| 4,873,292 | 10/1989 | Ogata et al. | 525/408 |
| 5,100,992 | 3/1992 | Cohn et al. | 528/36 |
| 5,264,488 | 11/1993 | Takeuchi et al. | 525/89 |

FOREIGN PATENT DOCUMENTS

| | | |
|---|---|---|
| 0116288 | 8/1984 | European Pat. Off. . |
| 0396780A1 | 11/1990 | European Pat. Off. . |
| 0409678A1 | 1/1991 | European Pat. Off. . |
| 0409580A2 | 1/1991 | European Pat. Off. . |
| 2362180 | 3/1978 | France . |
| 61-268261 | 5/1985 | Japan . |
| 63-57661 | 3/1988 | Japan . |
| 2-204033 | 2/1989 | Japan . |
| 3-254938 | 3/1990 | Japan . |
| 3-193344 | 3/1991 | Japan . |

*Primary Examiner*—Charles R. Nold
*Attorney, Agent, or Firm*—Burns, Doane, Swecker & Mathis

[57] ABSTRACT

There is a disclosure of a method and a container for storing a blood or blood component, including a sheet material having a plurality of layers and wherein the layers are adhered to each other, at least a portion of the layer which contacts blood or blood components is composed of a block copolymer having a micro-phase separating structure. In accordance with the present invention, there is provided a container which has excellent properties in relation to the storage of platelet, gas permeability and mechanical strength. Also, there is a disclosure of a method and a tube for transfusing blood or a blood component, including a tube material having a plurality of the same layers as the above.

44 Claims, No Drawings

CONTAINER FOR STORING BLOOD OR BLOOD COMPONENT

This application is a continuation in part of Ser. No. 083,290 filed Jun. 29, 1993, now abandoned.

BACKGROUND OF THE INVENTION

1. Field of the Invention

The present invention relates to a container for storing blood or blood components. More specifically, it relates to a container for storing blood or blood components to substantially prevent the activation of the blood or blood component, in particular to substantially prevent the activation and adhesion of platelet onto the surface of the container to be contacted. The present invention also relates to a tube for transfusing blood or blood components. More specifically, it relates to a tube for transfusing blood or blood components to substantially prevent the activation of the blood or blood component, in particular to substantially prevent the activation and adhesion of platelet onto the surface of the tube to be contacted.

2. Description of the Prior Art

In recent years, during the storage of blood for transfusion in a container, in order to minimize damage to the blood, in particular erythrocyte, a flexible soft bag made of polyvinyl chloride has been used in place of a hard, glass container. Moreover, in order to improve the storage ability, several kinds of anticoagulants and solutions for storing blood have been developed and employed.

Alternatively, the blood sampled is divided by centrifugal action or membrane separation into components for ease of usage, and stored as a preparation for concentrated erythrocyte, a platelet poor plasma, a platelet rich plasma, or a preparation for concentrated erythrocyte or the like. In particular, with large volumes of erythrocyte, the erythrocyte is stored at 22° C. so as not to deform its shape, and is further required to be provided with a sufficient amount of oxygen. Consequently, a demand for a container exhibiting good permeability to oxygen, and made of polyolefin has been required in place of polyvinyl chloride bags, and improved containers have been provided.

As materials for such bags made of polyolefin, there is cited, for instance, in U.S. Pat. No. 4,140,162 a composition comprising a polymer made of polypropylene as a main component and a hydrogenated block copolymer (hereinafter referred to as "SEBS")in which a polystyrene-polybutadiene-polystyrene block copolymer is hydrogenated. Such a copolymer, known as a thermoplastic elastomer, exhibits excellent elastomer elastic properties at room temperature. However, such a material has unbalanced properties relating to resistance to heat, workability, transparency, flexibility, gas permeability or the like.

In addition, there has been proposed a composition containing a softening agent in order to improve the workability and flexibility thereof (U.S. Pat. No. 3,830,767, and Japanese Kokai 63-57661). However, the diffusion of softening agent from the bags and the reduction of mechanical strength are not negligible during storage. Moreover, since the activation of blood components, in particular platelet, occurs during storage, such containers are not suitable for storing blood or blood components.

On the other hand, it is common in the medical field to judge the condition state of one's health by sampling a blood and measuring the components of the blood and the properties of those components. In those cases, as a container for temporarily storing blood, a glass tube, and a spitz tube made of plastic such as polystyrene, polyethylene, polypropylene, polymethyl methacrylate, or polyethylene terephthalate are used. Moreover, in the case of both sampling and storing of blood, vacuum blood sampling tubes made of glass or plastic such as polymethyl methacrylate and terephthalate are used.

As described above, in recent years, in order to store blood, in particular platelet, a bag made of polyolefin, that has an oxygen permeability several times greater than the conventional soft bag made of polyvinyl chloride has been used for storing blood at 22° C. However, such bags made of polyolefin have the disadvantage in that platelet is liable to adhere to the surface thereof, in other words accelerating the activation of platelet. Hence, the storage conditions are not very good. Accordingly, there is a need for bag for storing blood or blood components, which has an excellent balance properties, relating to heat resistance, workability, transparency, flexibility, or gas permeability.

Also, when using a spitz tube or a vacuum blood sampling tube, in which blood is temporarily stored, or a blood tube for transfusion, platelet is liable to adhere to the inner surface thereof. Therefore, under these conditions, such containers are not good for inspecting the number or condition of platelet.

An object of the present invention is, therefore, to provide a container for storing blood or a blood component or a tube for transfusing blood or a blood component to substantially suppress the activation of blood, in particular platelet, during storage or transfusion.

Another object of the present invention is to provide a method for producing a container for blood or blood components, and a tube for transfusing blood or blood components, which are simply and easily manufactured.

SUMMARY OF THE INVENTION

According to the present invention, there is provided a container for storing blood or a blood component, comprising a sheet material having a plurality of layers and wherein said layers are adhered to each other, said sheet material comprising:

a first layer, at least a portion of which is made of a block copolymer composition having a micro-phase separating structure, and which contacts blood or blood components so as to substantially prevent the activation and adhesion of platelet to said first layer; and block copolymer composition being at least one member selected from the group consisting of a polyamide elastomer, a polyester elastomer, a polyurethane elastomer, and a hydroxyethyl methacrylate-styrene block copolymer, and a second layer, positioned at the opposite side of said first layer to contact blood or blood components, made of a thermoplastic resin composition.

According to the present invention, there is provided a container for storing blood or a blood component, comprising a sheet material having a plurality of layers and wherein said layers are adhered to each other, said sheet material comprising:

a first layer, at least a portion of which is made of a polyamide elastomer having a micro-phase separating structure, and which contacts blood or blood components so as to substantially prevent the activation and adhesion of platelet to said first layer; and a second layer, positioned at the opposite side of said first sheet to contact blood or blood components, made of a thermoplastic resin composition containing 40 to 90% by weight of a hydrogenated diene copolymer (i) and 60 to 10% by weight of a polyolefin resin based on the weight of said thermoplastic resin composition, said hydrogenated diene copolymer (i) being straight chained or branched, having a number average molecular weight of 50,000 to 300,000, and at least 80% of the double bonds of the conjugated diene portions of a first or second block copolymer being hydrogenated, said first block copolymer being composed of, % by weight, 3–30 of a polymer unit (A), 40–80 of a polymer unit (B) and 10–40 of a polymer unit (C), providing the sum of said polymer units (A), (B) and (C) is 100%, said polymer unit (A) containing more than 90% by weight of an aromatic vinyl compound as a monomer unit, based on the weight of said polymer unit (A), said polymer unit (B) being a conjugated diene copolymer or an aromatic vinyl compound-conjugated diene copolymer wherein the vinyl bonding rate is in the range of 30–90%, said polymer unit (C) being a polybutadiene polymer wherein the vinyl bonding rate is in the range of no more than 30%, and said second block copolymer being composed of said polymer units (A), (B) and (C) of said first block copolymer, and further containing a coupling agent between or at the terminal position thereof.

According to the present invention, there is provided a container for storing a blood or blood component, comprising a sheet material having a plurality of layers and wherein said layers are adhered to one other, said sheet material comprising:

a first layer, at least a portion of which is made of a polyamide elastomer having a micro-phase separating structure, and which contacts blood or blood components so as to substantially prevent the activation and adhesion of platelet to said first layer; and a second layer, positioned at the opposite side of said first layer to contact blood or blood components, said second layer being made of a thermoplastic resin composition containing 40 to 90% by weight of a hydrogenated diene copolymer (ii), and 60 to 10% by weight of a polyolefin resin, based on the weight of said thermoplastic resin composition, said hydrogenated diene copolymer (ii) being straight chained or branched, having a number average molecular weight of 50, 000 to 400,000, and a least 80% of the double bonds of the conjugated diene portions of a second or fourth block copolymer being hydrogenated, said second block copolymer being represented by either of the following formula:

{(D)-(E)-(D)}p, or,

{(D)-(E)}p wherein polymer unit (D) is a polybutadiene polymer having a vinyl bonding rate of not more than 20%, and polymer unit (E) is a conjugated diene polymer or an aromatic vinyl compound-conjugated diene copolymer wherein the vinyl bonding rate is in the range of 30–90%, and p is an integer of more than 1, and a fourth block copolymer being composed of said polymer units (D) and (E) of said third block copolymer, and further containing a coupling agent among or at the terminal position thereof.

According to the present invention, there is provided a tube for transfusing blood or a blood component, comprising a tube material having a plurality of layers adhered to each other, said tube material comprising:

an innermost layer, at least one portion of which is made of a block copolymer having a micro-phase separating structure, said block copolymer being at least one member selected from the group consisting of a polyamide elastomer, a polyester elastomer, a polyurethane elastomer, and a hydroxyethyl methacrylate-styrene block copolymer; and a second layer, positioned at the opposite side of said innermost layer to contact blood or blood components, being made of a thermoplastic resin composition containing 40 to 90% by weight of at least one member selected form a group consisting of hydrogenated diene copolymers (i), (ii) and (iii), and 60 to 10% by weight of a polyolefin resin, based on the weight of said thermoplastic resin composition;

said hydrogenated diene copolymer (i) being straight chained or branched, having a number average molecular weight of 50,000 to 300,000 and a first or second block copolymer having at least 80% of the double bonds of the conjugated diene portions being hydrogenated, said first block copolymer having one or more of the polymer units (A), (B) and (C), respectively, said polymer unit (A) containing more than 90% by weight of an aromatic vinyl compound, based on the weight of said polymer unit (A), said polymer unit (B) being a conjugated diene polymer or an aromatic vinyl compound-conjugated diene copolymer wherein the vinyl bonding rate is in the range of 30–90%, said polymer unit (C) being a polyurethane polymer wherein the vinyl bonding rate is in the range of not more than 30%, the ratio of said polymer units (A), (B) and (C) being 3–30:40–80:10–40% by weight, providing the sum of said polymer units (A), (B) and (C) is 100%, and said second block copolymer being composed of said polymer units (A), (B) and (C) of said first block copolymer, and further containing a coupling agent residue between or at the terminal position thereof;

said hydrogenated diene copolymer (ii) being straight chained or branched, having a number average molecular weight of 50,000 to 400,000 and a third or fourth block copolymer having at least 80% of the double bonds of the conjugated diene portions being hydrogenated, said third block copolymer being represented by any one of the following formulae:

{(D)-(E)-(D)}p, or

{(D)-(E)}p wherein polymer unit (D) is a polybutadiene polymer having a vinyl bonding rate of not more than 20%, and polymer unit (E) is a conjugated diene polymer or an aromatic vinyl compound-conjugated diene copolymer wherein the vinyl bonding rate is in the range of 30–90%, and p is an integer of more than 1, and said fourth block copolymer being composed of said polymer units (D) and (E) of said third block copolymer, and further containing a coupling agent residue between or at the terminal position thereof; and said hydrogenated diene copolymer (iii) being straight chained or branched, having a number average molecular weight of 50,000 to 400,000 and a fifth or sixth block copolymer having at least 80% of the conjugated diene portions being hydrogenated, said fifth copolymer being represented by the following formula:

(F)-{(G)-(F)}q wherein (F) is a polymer unit made of more than 90% by weight of an aromatic vinyl compound, (G) is a polymer unit made of a conjugated diene wherein a vinyl bonding rate is 30–90%, and q is an integer of more than 1, and said sixth block copolymer being composed of said polymer units (F) and (G), and further containing a coupling agent residue between or at the terminal position thereof.

Namely, the tube material may be the same as the sheet material for the container of the present invention.

DETAILED DESCRIPTION OF THE INVENTION

The present invention relates to a container for blood or a blood component, comprising a sheet material having a plurality of layers, at least a portion of a first layer is made of a block copolymer composition having a micro-phase separating structure, and said first layer contacts blood or blood components so as to substantially prevent the activation and adhesion of platelet to said first layer.

The present invention relates to a tube for transfusing blood or a blood component, comprising a tube material having a plurality of layers, at least a portion of a first layer is made of a block copolymer composition having a micro-phase separating structure, and said first layer contacts blood or blood components so as to substantially prevent the activation and adhesion of platelet to said first layer.

The block copolymer composition is preferably at least one member selected from the group consisting of a polyamide elastomer, a polyester elastomer, a polyurethane elastomer, and a hydroxyethyl methacrylate-styrene block copolymer.

A second layer is preferably composed of a thermoplastic resin composition containing 40 to 90% by weight of at least one of the following hydrogenated diene copolymers (i), (ii) and (iii), and 60 to 10% by weight of a polyolefin resin, based on the weight of said thermoplastic resin composition.

Hydrogenated diene copolymer (i) is straight chained or branched, has a number average molecular weight of 50,000 to 300,000, and at least 80% of the double bonds of the conjugated diene portions of a first or a second block copolymer are hydrogenated.

The first block copolymer has, but is not limited to, one or more of the following polymer units (A), (B) and (C), respectively. Polymer unit (A) contains more than 90% by weight of an aromatic vinyl compound, based on the weight of the polymer unit (A), polymer unit (B) is a conjugated diene polymer or an aromatic vinyl compound-conjugated diene copolymer wherein the vinyl bonding rate is in the range of 30–90%, and polymer unit (C) is a polyurethane polymer wherein the vinyl bonding rate is in the range of not more than 30%. The ratio of the polymer units (A), (B) and (C) in first block copolymer is 3–30:40–80:10–40% by weight, providing the sum of the polymer units (A), (B) and (C) is 100%.

The second block copolymer is composed of the polymer units (A), (B) and (C) of first block copolymer, and further contains a coupling agent residue between or at the terminal position thereof.

Hydrogenated diene copolymer (ii) is straight chained or branched, has a number average molecular weight of 50,000 to 400,000, and at least 80% of the double bonds of the conjugated diene portions of the third or fourth block copolymer are hydrogenated.

The third block copolymer is represented by one of the following formulas:

$$\{(D)\text{-}(E)\text{-}(D)\}p, \text{ or,}$$

$$\{(D)\text{-}(E)\}p$$

wherein polymer unit (D) is a polybutadiene polymer having the vinyl bonding rate of not more than 20%, polymer unit (E) is a conjugated diene polymer or an aromatic vinyl compound-conjugated diene copolymer wherein the vinyl bonding rate is in the range of 30–90%, and p is an integer of more than 1.

The fourth block copolymer is composed of the polymer units (D) and (E) of the third block copolymer, and further contains a coupling agent residue between or at the terminal position thereof.

Hydrogenated diene copolymer (iii) is straight chained or branched, has a number average molecular weight of 50,000 to 400,000 and at least 80% of the double bonds of the conjugated diene portions of a fifth or a sixth block copolymer are hydrogenated.

The fifth block copolymer is represented by the following formula:

$$(F)\text{-}\{(G)\text{-}(F)\}q$$

wherein (F) is a polymer unit of which more than 90% by weight is an aromatic vinyl compound, (G) is a polymer unit made of a conjugated diene wherein the vinyl bonding rate is 30–90%, and q is an integer of more than 1.

The sixth block copolymer is composed of the polymer units (F) and (G), and further contains a coupling agent residue between or at the terminal position thereof.

The polyolefin resin is, but not limited to, a resin polymerized from one or more mono-olefins as a main component by either a low pressure procedure or a high-pressure procedure. Examples of the mono-olefin are ethylene, propylene, 1-butene, 1-penene, 1-hexene, 4-methyl-1-pentene, 2-methyl-1-penene, 2-methyl-1-propene, 3-methyl-1-pentene, or 5-methyl-1-hexene or a mixture thereof, preferably ethylene, propylene, or 4-methyl-1-pentene, more preferably ethylene, or propylene.

Moreover, examples of said polyolefin resin are polyethylene, polypropylene, poly-4-methyl-1-pentene; a propylene copolymer of propylene and at least one member selected from the group consisting of ethylene, 1-butene, 1-hexene, 4-methyl-1-propene, 3-methyl-1-pentene and 5-methyl-1-hexene; or a polyethylene copolymer of ethylene and at least one member selected from the group consisting of 1-butene, 1-pentene, 1-hexene, vinyl acetate, methyl acrylate, ethyl acrylate, acrylic acid, methacrylic acid, methyl methacrylate, ethyl methacrylate, maleic acid and maleic anhydride, preferably polypropylene, polyethylene, the aforementioned polypropylene or polyethylene copolymers.

In a container for storing blood or a blood component of the present invention comprising a sheet material having a plurality of layers and wherein the layers are adhered to each other, it is very important that the first layer contacts blood or blood components so as to substantially prevent the activation and adhesion of platelet to first layer, and that the second layer be composed of, mainly, thermoplastic resin composition containing the hydrogenated diene copolymers (i), (ii) and (iii), and the polyolefin resin. Further, it is preferable to insert a third layer between the first and second layers. These approaches are also applied for a tube for transfusing blood or a blood component of the present invention.

The present invention relates to a container for storing blood or a blood component comprising a sheet material having a plurality of layers, one of which is made of a block copolymer composition, and which contacts blood and blood components. When blood or a blood component is inserted into the container of the present invention, the blood or blood component can be stored to prevent the activation of the blood component, in particular platelet and to prevent the activation and adhesion of platelet to the first layer.

The present invention relates to a tube for transfusing blood or a blood component comprising a tube material having a plurality of layers, one of which is made of a block copolymer composition, and which contacts blood and blood components. When blood or a blood component is inserted into the tube of the present invention, the blood or blood component can be transfused to prevent the activation of the blood component, in particular platelet and to prevent the activation and adhesion of platelet to the first layer.

The block copolymer composition which prevents the activation and adhesion of platelet, suitably has a micro-phase separating structure. Examples of the block copolymer composition are a polyamide elastomer, a polyester elastomer, a polyurethane elastomer, and a hydroxyethyl methacrylate-styrene block copolymer.

A micro-phase separating structure means a dispersion system of fine phases with a molecular size order of several hundred angstroms as described in several references, for instance, "High functional polymer alloy" {Sentan Kobunshi Zairyo series 3, Kobunshi-Gakkai, 3 page, (1991)} (in Japan).

Examples of the polyamide elastomer are a multi-block copolymer having, as a hard segment thereof, a crystalline polyamide exhibiting a high melting point, and, as a soft segment thereof, an amorphous polyether or polyester exhibiting a low glass transition temperature, preferably polyether amide (polyether ester amide) or polyester amide.

The crystalline polyamide of the polyamide elastomer exhibiting a high melting point for the hard segment, is made of a lactam or an amino acid, the carbon numbers of the hydrocarbon chains of which are 4–14, or a mixture of a condensation product of a first dicarboxylic acid and a diamine, and a second dicarboxylic acid.

Examples of the lactam are, but not limited to, e-capro lactam, w-lauryl lactam, w-enanthic lactam, w-dodecanoic lactam, w-undecanoic lactam, or w-dodecanoic lactam, preferably e-capro lactam or w-lauryl lactam.

Examples of the amino acid are, not but limited to, 11-amino-undecanoic acid or 12-amino-dodecanoic acid.

Examples of the first dicarboxylic acid for the condensation product of dicarboxylic acid and diamine are, but not limited to, adipic acid, azelaic acid, sebacic acid, or 1, 12-decanedioic acid, and examples of the diamine therefor are, but not limited to, hexamethylenediamine or nonamethylenediamine. The preferred condensation product is one made of adipic acid and hexamethylenediamine.

Examples of the second dicarboxylic carboxylic acid, which is used for preparing a polyamide having a carboxylic group at the terminal ends, are, but not limited to, an aliphatic dicarboxylic acid having 4–20 carbon atoms such as succinic acid, adipic acid, suberic acid, azelaic acid, sebacic acid, undecanoic acid, or dodecanoic acid, preferably adipic acid.

The number average molecular weight of the aliphatic polyamide elastomer is, usually, 300 to 15,000, preferably 800 to 5,000.

The aliphatic polyether for the soft segment of the polyamide elastomer, having a low glass transition temperature, is a polyalkylene glycol having a number average molecular weight of 200 to 6,000. Examples of the polyalkylene glycol are, but not limited to, polyethylene glycol, polypropylene glycol, polytetramethylene glycol, or a polyethylene glycol-polypropylene glycol block copolymer, preferably tetramethylne glycol.

The end groups of the aliphatic polyether are amino groups or hydroxy groups. The aliphatic polyether having amino groups at the terminal ends binds the polyamide block having carboxylic acids groups at the terminal ends by amide bond. The aliphatic polyether having hydroxy groups at the terminal ends binds the polyamide block having carboxylic acid group at the terminal ends by ester bond.

These polyamide elastomers are available as DIAMIDE-PAE (a product sold by Daicel-Huels Ltd in Japan), UBE POLYAMIDE ELASTOMER (a product sold by UBE INDUSTRIES, LTD in Japan), GRILON ELX and GRILON ELY (a product sold by EMS Japan CORP. in Japan), GRILUX A (a product sold by DAINIPPON INK AND CHEMICALS, INC. in Japan), NOVAMID EL (a product sold by Mitsubishi Kasei Corporation in Japan) or PEBAX (a product sold by Toray Industries, Inc. in Japan or Elf Atochem Japan).

Examples of the polyester elastomer are, but not limited to, a polyester polyether elastomer having, as a hard segment thereof, an aromatic polyester such as a condensation product of 1,4-butanediol and terephthalic acid, and, as a soft segment thereof, a condensation product of an aliphatic polyether e.g. polytetramethylene glycol and terephthalic acid, or a polyester polyether elastomer having, as the soft segment, an aliphatic polyester and, as the hard segment, the same as the above polyester polyether elastomer. These polyelastomers are available as PELPRENE (a product sold by TOYOBOCO, LTD in Japan), Hytrel (a product sold by Du Pont-Toray Co., Ltd. in Japan), GRILUX E (a product sold by DAINIPPON INK AND CHEMICALS, INC. in Japan) or LOWMOD(a product sold by GEPlastics Organ, Ltd. in Japan).

Examples of the polyurethane elastomer are, but not limited to, ones having a polyurethane as a hard segment thereof. These polyurethane elastomers are available as PANDEX (a product sold by DAINIPPON INK AND CHEMICALS, INC. in Japan), Miractran (a product sold by Nippon Miractran Company Limited in Japan), REZAMIN P (a product sol by Dainichiseika Color & Chemicals Mfg. Co., Ltd. in Japan), TAKERAKKU and EXXRAN (a product sold by Takeda-Badishe Urethane K.K. in Japan), YOUFINE (a product sold by Asahi Glass Co., Ltd. in Japan), ESTEN and ESTALOCK (a product sold by Kyowa Hakko Kogyo Co. Ltd. in Japan), DESMOPAN and TEXIN (a product sold by Sumitomo Bayer Urethane Co., Ltd. in Japan or Bayer Japan Ltd. in Japan), MOBIRON (a product sold by Nissin Boseki K.K. in Japan), HYPUREN (a product sold by Chiba polyol Co. Ltd. in Japan), or KURAMIRON U (a product sold by Kuraray Co., Ltd. in Japan).

Examples of the block copolymer of styrene and hydroxyl methacrylate are, but not limited to, ones produced by an anion living polymerization or coupling method. A brief method for coupling is explained as follows:

Styrene is photo-polymerized using a polymerization initiator of diisocyanate diphenyl disulfide at 30° C. for 15 hours to synthesize an oligostyrene having isocyanate groups at both terminals. Separately, hydroxyethyl methacrylate (HEMA) is polymerized using azobisisobutironitrile (AIBN) as a polymerization initiator and aminoethane thiol as a chain transfer agent to synthesize an oligohydroxyethyl methacrylate having an amino group at the terminal. The resultant oligostyrene and the resultant oligohydroxyethyl methacrylate, the amount of the latter being about twice that of the former, is reacted in dimethylformamide to produce an ABA block copolymer with an urethane bonding.

Now thermoplastic polymer compositions of the present invention for the second layer will be explained.

The second layer of the thermoplastic polymer composition is composed of 40–90%, preferably 50–85%, more preferably 55–85% by weight of at least one of the hydrogenated diene copolymers (i), (ii) and (iii), and 60–10%, preferably 50–15%, more preferably 45–15% by weight of a polyolefin resin, based on the weight of the thermoplastic resin composition. If the amount of polyolefin is less than 10% by weight, the resultant composition has inferior fluidity and resistance to heat properties. Adversely, if the amount of polyolefin is more than 60% by weight, the resultant sheet material has inferior flexibility and gas permeability properties.

The thermoplastic polymer composition is divided into the hydrogenated diene copolymers (i), (ii) and (iii), and the polyolefin resin, and will be explained in turn.

Hydrogenated diene copolymer (i):

Examples of an aromatic vinyl compound used for hydrogenated diene copolymer (i) are, but not limited to, styrene, t-butyl styrene, a-methyl styrene, p-methyl styrene, divinylbenzene, benzene, 1,1-diphenyl styrene, N,N-dimethyl-p-aminoethyl styrene, N,N-diethyl-p-amino styrene or vinyl pyridine or a mixture thereof, preferably styrene or a-methyl styrene.

With a view to producing a hydrogenated diene copolymer having excellent properties, examples of a conjugated diene used for the hydrogenated diene copolymer (i) are, but not limited to, 1,3-butadiene, isoprene, 2,3-dimethyl-1,3-butadiene, 1,3-pentadiene, 2-methyl-1,3-pentadiene, 1,3-hexadiene, 4,5-dimethyl-1,3-octadiene, 3-butyl-1,3-octadiene, or chloroprene or a mixture thereof, preferably 1,3-butadiene, isoprene, 1,3-pentadiene, more preferably 1,3-butadiene and isoprene.

Examples of polymer unit (A) used for the hydrogenated diene copolymer (i) is a polymer of an aromatic vinyl compound, or a polymer of which more than 90% by weight is an aromatic vinyl compound and a conjugated diene. If the amount of the aromatic vinyl compound of polymer unit (A) is less than 90% by weight, the resultant sheet material is not preferred because of the reduction of the mechanical strength and resistance to heat properties. When polymer unit (A) is made of an aromatic vinyl compound and a conjugated diene, more than 80% of the conjugated diene portions are hydrogenated. The proportion of polymer unit (A) is 3–30%, preferably 5–30% by weight, based on the resultant diene copolymer. If the proportion of polymer unit is less than 3% by weight, the resultant sheet material has insufficient resistance to heat properties. Adversely, if the amount is more than 30% by weight, the flexibility of the resultant sheet material decreases. Polymer unit (A) has a preferred number average molecular weight of 5,000 to 70,000.

Examples of polymer unit (B) used for the hydrogenated diene copolymer (i) is a polymer of a conjugated diene, or a copolymer of not more than 50% by weight of an aromatic vinyl compound and a conjugated copolymer, in which the vinyl bonding rate of the conjugated diene is 30 to 90%, preferably 40 to 80% by weight, based on the resultant polymer unit (B), and more than 80% of the conjugated diene portions are hydrogenated. If the amount of conjugated diene of polymer unit (B) is not more than 50% by weight, the resultant sheet material is not preferred because of a decrease in flexibility. If the vinyl bonding rate is not more than 30%, when the resultant diene copolymer is hydrogenated, a polyethylene chain occurs which results in a loss of rubber like properties. If the vinyl bonding rate is more than 90%, when the resultant diene copolymer is hydrogenated, the glass transition temperature rises thereby losing the rubber-like properties. The proportion of polymer unit (B) is 40 to 80%, preferably 45 to 75% by weight, based on the weight of the resultant diene copolymer. If the proportion is not more than 40% by weight, the flexibility of the resultant diene copolymer decreases. Adversely, if the proportion is more than 80% by weight, the workability thereof decreases. Polymer unit (B) has a preferred number average molecular weight of 20,000–300,000.

Examples of polymer unit (C) used for hydrogenated diene copolymer (i) are ones in which more than 80% of the double bonds of the butadiene portions of polybutadiene are hydrogenated, and in which the vinyl bonding rate is less than 30%, preferably 3–20%. When the vinyl bonding rate for polybutadiene is more than 30% before hydrogenation, then after the polybutadiene is hydrogenated, the properties of the resin decreases and the properties of a thermoplastic elastomer are lost. The proportion of polymer unit (C) is 10 to 40%, preferably 10 to 30% by weight, based on the weight of the resultant diene copolymer. If the proportion is less than 10% by weight, the mechanical properties of the resultant hydrogenated diene copolymer decrease. Adversely, if the proportion is more than 40% by weight, the flexibility thereof is inferior. Polymer unit (C) has a number average molecular weight of 10,000 to 150,000 even though hydrogenation has not occurred.

The number average molecular weight of hydrogenated diene copolymer (i) of the present invention is 50,000 to 300,000, preferably 100,000 to 250,000. If the number average molecular weight is not more than 50,000, the resultant thermoplastic polymer composition has inferior mechanical strength and resistance to heat properties. Adversely, if the weight is not less than 300,000, its fluidability and workability decrease and the surface appearance is poor.

Additionally, second block copolymer used for the hydrogenated diene copolymer (i) is bonded, via a coupling agent residue, to at least one polymer units (A), (B) and (C) of first block copolymer and thereby the polymer molecular chain is extended or branched, may be one represented by either of the following formulas:

{(A)-(B)-(C)}n-X, or,

{(A)-(B)-(C)}X{(A)-(B)} wherein n is an integer of 2–4 and X is a coupling agent residue, the coupling agent residue being at the terminal or between the block copolymers consisting of any of the polymer units (A), (B) and (C).

Examples of the coupling agent are, but not limited to, diethyl adipate, divinylbenzene, tetrachlorosilicon, butyltrichlorosilicon, tetrachlorotin, butyltrichlorotin, dimethylchlorosilicon, tetrachlorogermanium, 1,2-dibromoethane, 1,4-chloromethylbenzene, bis(trichlorosilyl) ethane, epoxy soybean oil, tolylene di-isocyanate, or 1,2,4-benzene triisocyanate or a mixture thereof.

Hydrogenated diene copolymer (i) used for the present invention is produced by a method described in EP 396,780.

Hydrogenated diene copolymer (ii):

The aromatic vinyl compound and conjugated diene used for hydrogenated diene copolymer (ii) are the same as described in the aforementioned hydrogenated diene copolymer (i). Hydrogenated diene copolymer (ii) is straight chained or branched, at least 80% of the double bonds of the conjugated diene portions of third block copolymer are hydrogenated, and the third block copolymer is represented by either of the following formulas:

{(D)-(E)-(D)}p, or,

{(D)-(E)}p wherein p is an integer of more than 1, (D) is a polymer unit, produced from a polybutadiene having a vinyl bonding rate of not more than 20% and (E) is a polymer unit, produced from a conjugated polymer or an aromatic vinyl compound-conjugated diene copolymer wherein the vinyl bonding rate of the conjugated portions is 30–90%.

When polymer unit (D) is hydrogenated, it become crystalline, the crystalline structure being similar to that of a low density polyethylene (LDPE). The vinyl bonding rate in polymer unit (D) is usually not more than 20%, preferably not more than 18%, and more preferably not more than 15%. If the proportion is not more than 20%, the melting point of the crystal remarkably decreases when the third block copolymer is hydrogenated, and the resultant hydrogenated diene copolymer (ii) has inferior mechanical properties.

Polymer unit (E) is a conjugated diene polymer, or an aromatic vinyl compound-conjugated diene copolymer. When it is hydrogenated, it shows a structure similar to that of a rubber-like ethylene-butene copolymer or an aromatic vinyl compound-ethylene-butene copolymer.

The amount of aromatic vinyl compound used for Polymer unit (E) is usually, % by weight, not more than 35, preferably 30, more preferably 25, based on the weight of polymer unit (E). If the amount is not less than 35% by weight, the glass transition temperature of polymer unit (E) rises and the resultant hydrogenated diene copolymer (ii) is inferior in mechanical properties.

The proportion of vinyl bonding rate of the polybutadiene in polymer unit (E) is usually 30–90%, preferably 30–85%, and more preferably 30–80%. If the bonding rate is out of the above range during hydrogenation, the resulting third block copolymer has a crystal structure due to the polyethylene chain or polybutene-1-chain producing resinous properties, and hydrogenated diene copolymer (ii) has inferior mechanical properties.

The polymer units (D) and (E) in hydrogenated diene copolymer (ii) are usually, % by weight, 5–90, preferably 10–85 for polymer unit (D), and 95–10, preferably 90–15 for polymer unit (E), respectively. If the proportion of polymer unit (D)is not more than 5% by weight and that of polymer unit (E) is not less than 95% by weight, the third block copolymer has insufficient crystalline structure and the hydrogenated diene copolymer (ii) has inferior mechanical properties. Adversely, if the proportion of polymer unit (D) is not less than 90% by weight and that of polymer unit (E) is not more than 10% by weight, the hydrogenated diene copolymer (ii) increases in hardness.

For polymer units (D) and (E), at least 80%, preferably 90%, more preferably 95–100% of the double bonds of the butadiene portions are hydrogenated. If the proportion is not more than 80%, hydrogenated diene copolymer (ii) has inferior resistance to heat and weathering resistance. The number aveage molecular weight of polymer unit (D) or (E)is usually more than 5,000, preferably 10,000, and more preferably 15,000, respectively. If the number average molecular weight is less than 5,000, the hydrogenated diene copolymer (ii) has inferior mechanical properties.

The number average molecular weight of hydrogenated diene copolymer (ii) is usually 50,000–400,000, preferably 100,000–400,000. If the number average molecular weight is not more than 50,000, the hydrogenated diene copolymer (ii) has poor properties relating to mechanical strength, fluidity, resistance to heat and workability, as well as a poor surface appearance. Adversely, if the number average molecular weight is not less than 400,000, the hydrogenated diene copolymer (ii) has poor fluidity and workability, as well as surface appearance.

Additionally, before hydrogenation, the fourth block copolymer used for hydrogenated diene copolymer (ii) may be represent by the following formulas:

{(D)-(E)}n-X, or,

{(D)-(E)-(D)}n-X wherein n and X are the same as defined above, the coupling agent residue is positioned at the terminal thereof, and the block copolymer is straight chained or branched.

The coupling agent can be used for those described in hydrogenated diene copolymer (i).

Hydrogenated diene copolymer (ii) can be produced in accordance with the method described in EP 409,580.

Hydrogenated diene copolymer (iii):

The aromatic vinyl copolymer and conjugated diene used for hydrogenated diene copolymer (iii) are the same as those used for those of hydrogenated diene copolymer (i).

Hydrogenated diene copolymer (iii) is straight chained or branched, at least 80% of the double bonds of the conjugated diene portions of fifth block copolymer are hydrogenated, and the fifth block copolymer is represented by the following formula:

(F)-{(G)-(F)}q wherein q is an integer of more than 1, (F) is a polymer unit of which more than 90% by weight is an aromatic vinyl compound, (G) is a polymer unit which is produced from a conjugated diene polymer having a vinyl bonding rate of 30–90%.

Polymer unit (F) is a polymer of which more than 90% by weight is an aromatic vinyl compound, based on the weight of polymer unit (F). If the proportion is not more than 90% by weight, the resultant sheet material has inferior mechanical strength and resistance to heat. The number average molecular weight of polymer unit (F) is preferably 5,000–70,000.

Polymer unit (G) is a polymer, in which at least 80% of the double bonds of the conjugated diene portions are hydrogenated, and the vinyl bonding rate of the conjugated diene portions is 30–90%, preferably 40–80%. If the vinyl bonding rate is not more than 30% during hydrogenation, the hydrogenated diene copolymer (iii) has a polyethylene chain and fails to have rubber-like properties. Adversely, if the vinyl bonding rate is not less than 90% during hydrogenation, the hydrogenated diene copolymer (iii) has a high glass transition temperature and does not have rubber-like properties. The proportion of polymer unit (G) is, % by weight, preferably 40–80, more preferably 45–75. If the proportion is not more than 40% by weight, the hydrogenated diene copolymer (iii) fails to have sufficient flexibility. Adversely, if the proportion is not less than 80% by weight, hydrogenated diene copolymer (iii) fails to have sufficient workability. The average number molecular weight is preferably 20,000 to 300,000.

Hydrogenated diene copolymer (iii) has a number average molecular weight in the range of 40,000–300,000, preferably 50,000–250,000. If the number average molecular weight is not more than 40,000, the resultant thermoplastic resin composition fails to have sufficient mechanical strength and resistance to heat. Adversely, if the number average molecular weight is not less than 300,000, the thermoplastic resin composition fails to have a sufficient fluidity and workability as well as appearance of the surface.

Hydrogenated diene copolymer (iii) is available as KRATON G and CARIFLEX (a product sold by Shell Company), JSR-TR (a product sold by Japan Synthetic Rubber Co., Ltd. in Japan), TAFPREN and TAFTEX (a product sold by Asahi Chemical Industry Co., Ltd. in Japan) or SEPTON (a product sold by Kuraray Co., Ltd. in Japan).

Polyolefin resin:

The polyolefin resin used for the thermoplastic resin composition is a resin made of a polymerization product of one or more monoolefins by a high or low pressure manner. Examples of the monoolefin are, but not limited to, ethylene, propylene, 1-butene, 1-pentene, 1-hexene, 4-methyl-1-pentene, 2-methyl-1-propene, 3-methyl-1-pentene, or 5-methyl-1-hexene or a mixture thereof, preferably ethylene or propylene. Examples of the polyolefin resin are, but not limited to, polyethylene, polypropylene, poly 4-methyl-1-pentene; a polypropylene copolymer of propylene with at least one member selected from the group consisting of ethylene, propylene, 1-butene, 1-pentene, 1-hexane, 4-methyl-1-pentene, 2-methyl-1-propene, 3-methyl-1-pentene, and 5-methyl-1-hexene: or a polyethylene copolymer of ethylene with at least one member selected from the group consisting of 1-butene, 1-pentene, 1-hexene, vinyl acetate, methyl acrylate, ethyl acrylate, methyl methacrylate, ethyl methacrylate, maleic acid, and maleic anhydride. Additionally, as the preferred polyolefin, polypropylene, polyethylene, the aforementioned polypropylene copolymer, or the aforementioned polyethylene copolymer are cited.

The polyolefin resin usually has a melt index of 0.1–70 g/10 min., preferably 0.2–55 g/10 min. (230° C., 2.16 Kg loading).

The thermoplastic resin composition is preferably subjected to prior kneading of the hydrogenated diene copolymers and the polyolefin resin, using a kneader such a kneader and double-screw extruder. The temperature for kneading is usually 160°–250° C., preferably 180°–240° C.

The sheet material of the present invention may include a further third layer between the first and second layers.

An example of the third layer is a polyfunctional group-containing polyolefin. The polyfunctional group-containing polyolefin is produced by modifying a polyolefin resin or rubber with the functional group, in which the polyolefin resin or rubber is produced by polymerizing an a-olefin as a main component. Examples of the a-olefin are, but not limited to, ethylene, propylene, 1-butene, 4-methyl-1-butene, or 4-methyl-1-pentene or a mixture thereof, preferably ethylene or propylene.

As the functional group, there is cited, for instance, unsaturated carboxylic acid or its derivatives. Examples of the functional group-containing compound are, but not limited to, maleic acid, fumaric acid, itaconic acid, citraconic acid, allysuccinic acid, nadic acid, methylnadic acid, maleic anhydride fumaric anhydride, or itaconic anhydride, preferably maleic anhydride.

Examples of the modification method are, but not limited to, a method for grafting a polyolefin resin or rubber in the solvent of an alkyl aromatic hydrocarbon at 115° C. using a radical initiator with the aforementioned functional group-containing compound, or a method for kneading a polyolefin resin or rubber and the functional group-containing compound with a small amount of alkyl peroxide, preferably an aliphatic double functional peroxide at a temperature over 200° C.

Examples of the functional group-containing compound are, but not limited to, maleic anhydride modified LDPE (low density polyethylene), maleic anhydride modified HDPE (high density polyethylene), maleic anhydride modified LLDPE (linear low density polyethylene), maleic anhydride modified EVA (ethylene-vinyl acetate copolymer), maleic anhydride modified PP (polypropylene), or ethylene-acrylate-maleic anhydride terpolymer, preferably maleic anhydride modified LLDPE.

For instance, there are available as ADMER (a product sold by Mitsui Petrochemical Industries, Ltd. in Japan), MODIC (a product sold by Mitsubishi Petrochemical Company Ltd. in Japan) or BONDINE (a product sold by Sumitomo Chemical Co., Ltd. in Japan).

The container for storing blood or a blood component of the present invention is preferably produced by extruding, blow forming, injection molding, or coating.

The tube for transfusing blood or a blood component of the present invention is preferably produced by extruding, blow forming, injection molding, or coating.

Among extrusion methods, it is suitable to adopt an inflation method or a T-die molding. In particular, in order to form the container having a plurality of layers, it is essential for first layer made of the block copolymer composition to be the position to contact blood or blood components e.g. by means of a multi-layer inflation forming, a co-extruding using a T-die, a wet lamination, a dry lamination or a thermal lamination.

Additionally, it is preferable to adopt an extrusion blow molding or injection blow molding to produce a container and a tube of the present invention. Otherwise, a parison which is produced by multilayer extrusion blow molding or several colors of injection molding, is laminated by injection blow molding, and then formed into a container and a tube of the present invention.

In addition to the above, the container and the tube can also be produced by injection molding.

Further, it is suitable to adopt multicolor injection molding to a container and a tube made of a plurality of layers, the first layer of which contacts blood or blood components.

Also, it is preferable to form the first layer, which contacts blood or blood components, on the inner surface of a container and a tube by coating. The coating may be carried out before or after the formation of the container and the tube. Moreover, a container and a tube are formed using a block copolymer composition having micro-phase separating structure of the present invention, and then the outer surface is further covered with other layers.

The first layer which contacts blood or blood components, has a sufficient thickness to prevent the activation of blood components, in particular to prevent the activation and adhesion of platelet to the first layer. If the invention is carried out, the first layer may be an irregular form such as an island pattern (any of both) or mesh. The block copolymer composition having a micro-phase separating structure occupies at least a portion of the inner surface to a level to prevent the deposition of blood components to the layer which contacts blood or blood components.

Using the block polymer composition having a micro-phase separating structure, it has the advantage of preventing the activation of blood components. The measurement or evaluation of the effect of the present invention may be evaluated in a number of common ways. For instance, a platelet adhesion test in which the degree of activation of platelet when the platelet contacts the material surface is measured, will be explained.

A blood is sampled from a human vein while adding to the blood 3.8% of an aqueous sodium citrate solution as an anticoagulant at a rate of one to nine volumes per volume of sampled blood. The sampled blood is centrifuged at 800 r.p.m. for five minutes to separate platelet rich plasma (PRP), and the numbers of platelet in the plasma is measured using a hemocytometer (sold under the trade name of "Sysmex NE-6000" by Toa Electronics Ltd. in Japan). The PRP is diluted with a diluent (0.01M PBS, pH: 7.0:3.8% aqueous sodium citrate solution=9:1 by volume rate) to regulate the number of platelet to an amount of $10^5$/ml. 200 ml of the diluted PRP is added dropwise on a sample piece, and then the thickness of the PRP layer is regulated to 2 mm from the upper side by loading with a petri dish. The added sample piece is left standing at room temperature for 30 minutes, then washed twice with the diluent, and stored in a PBS solution containing 1% of glutaric aldehyde at 4° C. for a day and a night to fix it. After washing with PBS, the sample piece is dehydrated using a series of ethanol solutions, the concentration of which rises from 50, 70, 80, 90, to 100 and 100%, and air-dried at room temperature for a day and night. The sample piece is ion-spattered, gold-coated and measured using a scanning electron microscope (SEM), and the SEM photograph is taken at a magnitude of 1,000 and in 5 fields. While the photograph obtained, the adhered platelet is classified and the number of adhered platelet calculated. The classification is carried out according to the following standards:

Type I: from no deformation to that a relatively short pseudopodium spreads.

Type II: from two to three pseudopodiums spread.

Type III: more four of the pseudopodium spread.

Type IV: platelet spreads and adheres in the shape of flat to the sample piece.

The types I–IV are replaced with 1–4, respectively, and the morphological score is defined as the value obtained by dividing the product of the number, which corresponds to the Type, and the number of the adhered platelet by the total numbers of the adhered platelet. When both of the total number of the adhered platelet and the morphological score are small, the material tested can prevent the activation of platelet.

Moreover, in order to store blood, in particular platelet, it is necessary to note the gas permeation of the container used. In other words, it is important to provide an ample amount of oxygen to the platelet cells in the container as well as preventing the activation of platelet, in particular the activation and adhesion of platelets to the layer which contacts the blood or blood components. The oxygen permeability for a typical container is usually in the range of more than 1,000, preferably more than 1,500 ml/m$^2$·day.atm (22° C.). The values are measured using a device for measuring gas permeation (sold under the trade name as "GMP-250" by GL Science).

Furthermore, if the steam permeability is higher, the vapor which originates from the water component of the blood, vaporizes. Therefore such a container is not good for storing blood or blood components.

In view of the above reasons, a sheet material suitably has a plurality of layers in order to secure an oxygen permeability therethrough at a necessary level and maintain the mechanical strength of the container. Accordingly, the sheet material which contacts blood and blood components, preferably has a plurality of layers made of the block copolymer composition, and made of the thermoplastic polymer composition of the hydrogenated diene copolymers (i), (ii) and (iii), and a polyolefin resin.

Since at least of the surface, which contacts blood or blood components, is made of the block copolymer composition, and the sheet material has a plurality of layers, the activation of blood or a blood component can be prevented. Therefore it is suitable for use as a blood bag, a vacuum sampling tube, a spits tube and a blood tube for transfusion. Of these it is preferably used as a blood bag for storing platelet, a vacuum sampling or spits tube for inspecting the number and morphology of platelet in the blood, blood coagulating system and a blood tube for transfusion.

EXAMPLES

The present invention is explained in more detail with reference to the following examples. Unless otherwise indicated all parts and percentages are by weight.

EXAMPLE 1

Thirty (30) % by weight of polypropylene EX-6 (a product sold by Mitsubishi Yuka K.K. in Japan), 68% by weight of KRATON G1652 (a styrene elastomer sold by Shell Chemical), 1.9% by weight of liquid paraffin (reagent grade, a product sold by Wako Jyunyaku K. K. in Japan), and 0.1% by weight of Irganox 1010 as an anti oxidant (a product sold by Ciba-Geigy) were charged into a twin-screw extruder (sold under the trade name of "PCM" by Ikegai Tekkou K.K. in Japan) to be mixed, and extruded as a strand. The strand was cut into pellets using a pelletizer for the basic material of the bag for storing platelet. The obtained material was treated using a Laboplastomil with a T-die in the width of 120 mm (a test machine sold by Toyo Seiki Seisaku-Sho Ltd. in Japan) to produce a sheet at a thickness of about 120 mm. Using the same machine, polyamide elastomer PAE1200 (a product sold by UBE INDUSTRIES, LTD. in Japan) was treated to form a sheet with a thickness of about 15 mm, and also BONDINETX-8030 (an adhesive resin sold by Sumitomo Chemical Co., Ltd. in Japan) was treated to form a sheet of about 15 mm. The obtained sheets are laminated in turn as the basic material/BONDINE/the polyamide elastomer, and treated by a heat laminating machine to form a laminate sheet. When measured with the tester (supra), the laminated sheet had an oxygen permeability of 2200 ml/m$^2$.day. atm (22° C.). Two of the laminated sheets were lapped so as to cause the faces of the polyamide elastomer to contact each other, and sealed with a heat seal machine (inventor's own machine) at a die temperature of 220° C. for 3 second to form (1) a bag for storing platelet with an inner volume of about 300 mi.

A material for the bag was cut into a piece of 8×8 mm, and tested for the platelet adhesion test (supra). The test result is shown in Table 1 below.

Four hundred (400) ml of whole blood were sampled from a healthy person into a bag containing an anticoagulant (CPD solution). The blood containing bag was centrifuged at 800 r.p.m. for 5 minutes and the resultant plasma containing a large amount of platelet (PRP) was aseptically charged into bag (1). Bag (1) was centrifuged at 3,000 r.p.m. for 10 minutes to settle the platelet, and pellets of the platelet were disentangled to be redispersed by the plasma which was a supernate of about 50 to 60 mi. The concentration of platelet is usually about 1,000,000 to 2,000,000 pieces/mm 3 depending on the individual. Bag (1) containing the dispersion of platelet was maintained at 22° C. for 5 days while shaking the bag with a stroke length of 20 mm and 90 times per minute.

After the 5 days, so long as the dispersion of platelet was visually checked, there was no change and the situation was very good. Moreover, there were no problems as involved with preparing the platelet, relating to the number of platelet per volume, the average volume of platelet, and the deviation of the volume distribution of platelet.

After the experiment, the used bag (1) was cut into pieces. The inner surface of the piece was washed twice with a PBS solution, and fixed in the PBS solution containing 1% of glutaraldehyde at 4° C. for a day and a night. After washing with PBS solution, a piece of bag (1) was dehydrated with a series of ethanol solutions, the concentration of which rose from 50, 70, 80, 90, 95 to 100 and 100%, and air-dried at room temperature for a day and a night. The piece was ion-spattered, gold-coated and measured using a scanning electron microscope (SEM), and the SEM photograph was taken at a magnitude of 1,000 and 5 fields. From the obtained photograph, the adhered platelet was classified and the number of adhered platelet was calculated. The classification was carried out according to the standards (supra). The test results are shown in Table 1 below.

EXAMPLE 2

The procedure of Example 1 was repeated, except that PEBAX 3533SA (a polyamide elastomer produced by Atochem and sold by TORAY Industries, Inc. in Japan) was used instead of PAE 1200 (supra), to obtain a bag (2) for storing platelet.

After the experiment, there were no problems with regard to the dispersion of the platelet. The test results are shown in Table 1 below.

EXAMPLE 3

The procedure of Example 1 was repeated, except that Hytrel 4047 (a polyester elastomer sold by Du Pont-Toray Co. Ltd. in Japan) was used instead of PAE 1200 (supra), to obtain a bag (3) for storing platelet.

After experiment, there were no problems the dispersion of the platelet. The test results are shown in Table 1 below.

EXAMPLE 4

The procedure of Example 1 was repeated, except that Miractran E-395 (a polyurethane elastomer sold by Nippon Miractran Company Ltd. in Japan) was used instead of PAE 1200 (supra), to obtain a bag (4) for storing platelet.

After experiment, there were no problems with regard to the dispersion of the platelet. The test results are shown in Table 1 below.

COMPARATIVE EXAMPLE 1

The procedure of Example 1 was repeated, except that a sheet composed of a monolayer made of the base material in Example 1, was used instead of the laminated sheet (composed of base material/BONDINE/PAE 1200), to obtain a bag (5) for storing platelet. The test results are shown in Table 1 below.

COMPARATIVE EXAMPLE 2

The procedure of Example 1 was repeated, except that a sheet composed of a monolayer of PAE 1200 (supra) produced at a thickness of 250 mm by T-die formation, was used instead of the laminated sheet (composed of the base material/BONDINE/PAE 1200), to obtain a bag (6) for storing platelet.

After the experiment, a reduction of pH and irreversible damage to the platelet were found to have taken place. This is probably because the necessary amount of oxygen was lacking and therefore the yield of lactic acid was accelerated. The sheet had an oxygen permeability of 800 ml/m$^2$·day. atm. Hence this bag is not suitable for storing platelet.

COMPARATIVE EXAMPLE 3

The procedure of Example 1 was repeated, except that a sheet composed of a monolayer of PEBAX 3533SA (supra) produced at a thickness of 250 mm by T-die formation, was used instead of the laminated sheet (composed of the based material/BONDINE/PAE 1200), to obtain a bag (7) for storing platelet.

After the experiment, a remarkable reduction of the water portions of the blood was found. There were disadvantages in that the concentration of platelet increased, the osmotic pressure balance of the platelet cell deteriorated, and the platelet deformed. Accordingly, this bag is not suitable as a bag for storing platelet.

EXAMPLE 5

The procedure of Example 1 was repeated, except that a sheet with a thickness of 240 mm was obtained using an inflation method of three layers using pellets of the base materials (supra), BONDINETX-8030 (supra), and PAE 1200 (supra). However, the thickness of each of the layers was not measured prior to forming the sheet.

After the experiment, there were no problems regarding the storage of platelet. The test results are shown in Table 1 below.

EXAMPLE 6

The procedure of Example 5 was repeated, except that a sheet with a thickness of 250 mm was obtained using a blow molding method of three layers using pellets of the base materials (supra), BONDINE TX-8030 (supra), and PAE 1200 (supra). The test results are shown in Table 1 below.

TABLE 1

| | Type I | Type II | Type III | Type IV |
|---|---|---|---|---|
| (Test results for platelet adhesion test) | | | | |
| Example 1 | 1 | 3 | 2 | 0 |
| Example 2 | 1 | 4 | 3 | 0 |
| Example 3 | 0 | 2 | 2 | 0 |
| Example 4 | 5 | 6 | 12 | 0 |
| Example 5 | 0 | 3 | 4 | 0 |
| Example 6 | 2 | 5 | 5 | 0 |
| Comparative example 1 | 0 | 2 | 378 | 453 |
| (Test results for SEM view of the inner surface) | | | | |
| Example 1 | 1 | 32 | 40 | 28 |
| Example 2 | 6 | 19 | 27 | 24 |
| Example 3 | 2 | 15 | 34 | 30 |
| Example 4 | 5 | 53 | 42 | 41 |
| Example 5 | 2 | 16 | 21 | 20 |
| Example 6 | 1 | 22 | 34 | 25 |
| Comparative example 1 | 7 | 63 | 188 | 614 |

The following hydrogenated diene copolymers were prepared in place of KRATON G1652, a styrene elastomer (supra). The analyses and evaluations of several properties of the copolymers are effected as follows:

1,2-Vinyl Bonding Rate of Polybutadiene

This was determined by an infrared spectroscopic analysis, and calculated according to the MORELOmethod.

Styrene Content

This was determined by an infrared spectroscopic analysis of the phenyl group at 699 cm$^{-1}$, and calculated based on a calibration curve.

Number Average Molecular Weight

This is detected by gel permeation chromatography using trichlorobenzene as a solvent, and calculated as polystyrene.

Rate of Hydrogenation

This is detected by a $^1$H-NMR spectroscopy at 100 MHz using tetrachloroethylene as a solvent.

Tensile Properties (Tensile Break Strength or Tensile Elongation at Break)

These are measured according to JIS (Japanese Industrial Standard) K6301.

Flexibility

This is measured according to JIS K6301, as JIS A hardness.

Transparency

A sheet having a thickness of about 0.6 mm is measured with regard to the haze by a multisource spectroscopic colorimeter (sold by Suga Shiken Kabushiki Kaisha in Japan). The lower the value, the more transparent is the sheet.

Resistance of Heat

A large number of samples, each measuring 2 mm×2 cm×2 cm are aged under the conditions of a 500 g/cm$^2$ loading at 140° C., for 30 minutes in a Geer oven. After aging, the aged samples are examined to detect blocking. The symbol O shows no blocking, and symbol X shows that there was blocking and the samples were not peeled.

Gas Permeability (Oxygen Permeability and Carbon Dioxide Permeability)

This is measured under the conditions of 23° C. and 50% RH in accordance with ASTM D1434.

Release Properties of a Laminate

Several previously prepared layers are laminated, melt adhered in a portion thereof in a hot press under the conditions of 50 Kg/cm$^2$ pressure at 230° C., and a test piece with a width of 15+/− 0.1 mm, a portion of which is melt adhered, is cut therefrom. The cut test piece is placed, with the layers thereof vertical, on the center of a tester. Both of the side layers, the ends of which are horizontal, are grasped by the hands of tester, and then horizontally pulled at a tensile speed of 20 mm/min. until the heat pressed portion is broken or released. The maximum loading is measured.

Several kinds of polymers used in the following examples are as follows:

Hydrogenated Diene Copolymers

The hydrogenated diene copolymers (Q 1–6) were purchased from JSR in Japan. The micro-structure, number average molecular weights, and the rates of hydrogenation, of Q 1–6 are shown in Table 2.

TABLE 2

| Micro-structure (%) | Q-1 | Q-2 | Q-3 | Q-4 | Q-5 | Q-6 |
|---|---|---|---|---|---|---|
| Content of polymer unit (A) | 15 | 15 | 10 | — | — | — |
| Styrene bonding rate in polymer unit (B) | 0 | 0 | 10 | — | — | 30 |
| Vinyl bonding rate in polymer unit (B) | 40 | 75 | 40 | — | — | 40 |
| Content of polymer unit (B) | 70 | 70 | 60 | — | — | 100 |
| Vinyl bonding rate in polymer unit (C) | 11 | 11 | 11 | — | — | — |
| Content of polymer unit (C) | 15 | 15 | 30 | — | — | — |
| Vinyl bonding rate in polymer unit (D) | — | — | — | 12 | 12 | — |
| Content of polymer unit (D) | — | — | — | 30 | 30 | — |
| Vinyl bonding rate in polymer unit (E) | — | — | — | 40 | 75 | — |
| Content of polymer unit (E) | — | — | — | 70 | 70 | — |
| Number-average molecular weight (× 10$^4$) | 15 | 15 | 15 | 25 | 25 | 15 |
| Rate of hydrogenation (%) | 98 | 98 | 98 | 99 | 97 | 98 |

Q-1: Hydrogenated diene copolymer (i)
Q-2: Hydrogenated diene copolymer (i)
Q-3: Hydrogenated diene copolymer (i)
Q-4: Hydrogenated diene copolymer (ii)
Q-5: Hydrogenated diene copolymer (ii)
Q-6: Comparative example, a random copolymer of styrene and 1,3-butadiene Polyolefin Resin PP-1: Mitsui Petrochemical Industries, Ltd. in Japan, HYPOLJ858Y PP-2: Mitsui Petrochemical Industries, Ltd. in Japan, HYPOLF601

EVA-1: Mitsubishi Petrochemical Industries, Ltd. in Japan, MITSUBISHI PORIETI-EVA X501

Thermoplastic Polyamide Elastomer

W-1: UBE INDUSTRIES, Ltd. in Japan, PAE 1200

W-2: Elf Atochem Company, PEBAX 4033SA (Functional Group-Containing) Polyolefin

V-1: Mitsui Petrochemical Industries, Ltd. in Japan, ADMER NF520

V-2: Sumitomo Chemical Co., Ltd. in Japan, BONDINETX8030

V-3: Mitsui Petrochemical Industries, Ltd. in Japan, ADMERLF530

V-4: TOSOH CORPORATION in Japan, ULTRASEN 710 (polyolefin without a functional group; ethylene-vinyl acetate copolymer)

EXAMPLES 7–19 AND COMPARATIVE EXAMPLES 4–10

Each of the layers using the corresponding composition shown in Tables 3–6 below was extruded, and formed into a laminated sheet using a multi T-die extruding method. The thickness was 0.4 mm for the thermoplastic composition layer, 0.1 mm for the polyamide elastomer layer which contacts blood or blood components, and 0.1 mm for the adhering layer.

The procedure of Example 1 was repeated, except that the above laminated sheets were used instead. The test results are shown in Tables 3–6 below.

TABLE 3

| | Examples | | | | | |
|---|---|---|---|---|---|---|
| | 7 | 8 | 9 | 10 | 11 | 12 |
| Structure of laminates Second layer | | | | | | |
| Q-1 | 80 | 70 | 90 | 40 | — | — |
| Q-2 | — | — | — | — | 40 | — |
| Q-3 | — | — | — | — | — | 40 |
| Q-4 | — | — | — | 30 | 30 | 30 |
| Q-5 | — | — | — | — | — | — |
| PP-1 | 20 | 30 | 10 | 30 | 20 | 30 |
| PP-2 | — | — | — | — | — | — |
| First layer | W-1 | W-1 | W-1 | W-1 | W-2 | W-1 |
| Third layer | V-1 | V-1 | V-1 | V-1 | V-2 | V-3 |
| Properties | | | | | | |
| Tensile break strength (kgf/cm$^2$) | 440 | 460 | 430 | 390 | 320 | 400 |
| Tensile break elongation (%) | 500 | 510 | 520 | 480 | 510 | 500 |
| Flexibility (JIS A) | 92 | 93 | 90 | 94 | 94 | 90 |
| Transparency (haze) | 15 | 18 | 13 | 14 | 19 | 20 |
| Resistance to heat | ○ | ○ | ○ | ○ | ○ | ○ |
| Coefficient of oxygen permeability × 10$^3$ mm.ml/m$^2$/day/atm | 4.9 | 4.2 | 7.9 | 4.3 | 4.1 | 4.2 |
| Coefficient of CO$_2$ permeability × 10$^3$ mm.ml/m$^2$/day/atm | 12.0 | 10.5 | 16.3 | 11.0 | 10.9 | 10.8 |
| Release porperties (kgf) | 3.0 | 2.0 | 2.5 | 1.9 | 2.7 | 3.1 |
| Type I–IV (based on SEM photography) | | | | | | |
| I | 3 | 6 | 5 | 12 | 9 | 5 |
| II | 21 | 35 | 12 | 11 | 33 | 24 |
| III | 30 | 30 | 26 | 33 | 24 | 50 |
| IV | 28 | 26 | 23 | 31 | 42 | 49 |

TABLE 4

| | Examples | | | | | | |
|---|---|---|---|---|---|---|---|
| | 13 | 14 | 15 | 16 | 17 | 18 | 19 |
| Structure of laminates Second layer | | | | | | | |
| Q-1 | — | 70 | 40 | — | — | — | 65 |
| Q-2 | — | — | — | — | — | — | — |
| Q-3 | — | — | 20 | — | — | — | — |
| Q-4 | 40 | — | 20 | 40 | 70 | 90 | — |
| Q-5 | 30 | — | — | — | — | — | — |
| PP-1 | 30 | — | 20 | 60 | 30 | 10 | — |
| PP-2 | — | 30 | — | — | — | — | — |
| EVA-1 | — | — | — | — | — | — | 35 |
| First layer | W-1 | W-2 | W-1 | W-1 | W-2 | W-1 | W-2 |
| Third layer | V-2 | V-3 | V-1 | V-1 | V-2 | V-3 | V-1 |
| Properties | | | | | | | |
| Tensile break strength (kgf/cm$^2$) | 380 | 450 | 430 | 440 | 480 | 420 | 240 |
| Tensile break elongation (%) | 490 | 500 | 530 | 550 | 460 | 480 | 550 |
| Flexibility (JIS A) | 91 | 93 | 90 | 95 | 93 | 90 | 89 |
| Transparency (haze) | 17 | 15 | 16 | 17 | 18 | 14 | 16 |
| Resistance to heat | ○ | ○ | ○ | ○ | ○ | ○ | X |
| Coefficient of oxygen permeability × 10$^3$ mm.ml/m$^2$/day/atm | 4.3 | 4.3 | 6.2 | 2.3 | 4.3 | 8.1 | 6.8 |
| Coefficient of CO$_2$ permeability × 10$^3$ mm.ml/m$^2$/day/atm | 11.0 | 8.0 | 15.0 | 4.9 | 10.0 | 20.3 | 15.6 |
| Release properties (kgf) | 2.3 | 2.8 | 2.6 | 2.2 | 2.6 | 3.2 | 3.0 |
| Type I–IV (based on SEM photography) | | | | | | | |
| I | 8 | 6 | 12 | 5 | 10 | 10 | 3 |
| II | 19 | 28 | 15 | 52 | 16 | 33 | 41 |
| III | 40 | 38 | 21 | 37 | 26 | 33 | 40 |
| IV | 21 | 33 | 26 | 40 | 29 | 24 | 25 |

TABLE 5

| | Comparative examples | | | |
|---|---|---|---|---|
| | 4 | 5 | 6 | 7 |
| Structure of laminates Second layer | | | | |
| Q-1 | 30 | 10 | 95 | — |
| Q-4 | — | 10 | — | — |
| Q-6 | — | — | — | 70 |
| PP-1 | 70 | 80 | 5 | 30 |
| First layer | W-1 | W-1 | W-1 | W-1 |
| Third layer | V-1 | V-1 | V-1 | V-1 |
| Properties | | | | |
| Tensile break strength (kgf/cm$^2$) | 420 | 400 | 150 | 100 |
| Tensile break elongation (%) | 300 | 250 | 500 | 500 |
| Flexibility (JIS A) | 100 | 100 | 88 | 83 |
| Transparency (haze) | 35 | 40 | 18 | 55 |
| Resistance to heat | ○ | ○ | X | ○ |
| Coefficient of oxygen permeability × 10$^3$ mm.ml/m$^2$/day/atm | 1.5 | 1.0 | 9.5 | 4.2 |
| Coefficient of CO$_2$ permeability × 10$^3$ mm.ml/m$^2$/day/atm | 4.0 | 2.5 | 20.0 | 9.2 |
| Release properties (kgf) | 2.5 | 3.1 | 2.4 | 2.7 |
| Type I–IV (based on SEM photography) | | | | |
| I | 8 | 5 | 12 | 13 |
| II | 55 | 73 | 23 | 26 |
| III | 34 | 312 | 36 | 24 |
| IV | 20 | 68 | 29 | 22 |

TABLE 6

|  | Comparative examples | | |
|---|---|---|---|
|  | 8 | 9 | 10 |
| Structure of laminates Second layer | | | |
| Q-1 | 70 | 70 | 70 |
| Q-4 | — | — | — |
| Q-6 | | | |
| SEBS1 | — | — | — |
| PP-1 | 30 | 30 | 30 |
| First layer | W-1 | W-1 | — |
| Third layer | — | V-4 | V-1 |
| Properties | | | |
| Tensile break strength (kgf/cm$^2$) | 320 | 400 | 330 |
| Tensile break elongation (%) | 500 | 500 | 500 |
| Flexibility (JIS A) | 93 | 93 | 93 |
| Transparency (haze) | 16 | 18 | 17 |
| Resistance to heat | O | O | X |
| Coefficient of oxygen permeability × 10$^3$ mm.ml/m$^2$/day/atm | 4.6 | 4.3 | 4.4 |
| Coefficient of CO$_2$ permeability × 10$^3$ mm.ml/m$^2$/day/atm | 10.6 | 10.4 | 10.3 |
| Released properties (kgf) Type I–IV (based on SEM photography) | 0 | 0 | 2.6 |
| I | 3 | 5 | 5 |
| II | 19 | 26 | 75 |
| III | 40 | 34 | 212 |
| IV | 28 | 19 | 943 |

It is clear from Tables 3 and 4 that the embodiments of the laminate of the present invention, Examples 7–19, are superior in properties regarding tensile, transparency, flexibility, release and gas permeation.

In contrast, comparative examples 4 and 5, which are beyond the scope of the present invention in that the amount of the hydrogenated diene copolymers used for the present thermoplastic copolymer composition is below the lower limit, shows that they are inferior in transparency, flexibility and gas permeability. Comparative example 6, which is beyond the scope of the present invention in that the amount of the hydrogenated diene copolymer composition is above the upper limit, shows a superior gas permeability, but inferior release and workability properties. Comparative example 7, in which a hydrogenated diene copolymer outside the scope of the present invention was used, shows inferior properties in relating to mechanical strength and transparency. Comparative example 8, in which there was no second layer, shows inferior release properties. Comparative example 9, in which a polyolefin resin outside the scope of the present invention was used as second layer, shows inferior release properties. Comparative example 10, in which a polyamide elastomer layer was not used, shows inferior resistance of heat.

EXAMPLE 20

Thirty (30) % by weight of polypropylene EX-6 (a product sold by Mitsubishi Yuka K.K. in Japan), 68% by weight of KRATON G1652 (a styrene elastomer sold by Shell Chemical), 1.9% by weight of liquid paraffin (reagent grade, a product sold by Wako Jyunyaku K. K. in Japan), and 0.1% by weight of Irganox 1010 as an anti oxidant (a product sold by Ciba-Geigy) were charged into a twin-screw extruder (sold under the trade name of "PCM" by Ikegai Tekkou K.K. in Japan) to be mixed, and extruded as a strand. The strand was cut into pellets using a pelletizer for the basic material of the tube for transfusing blood. By co-extruding three layers using three tube extruders (two extruders are available from I.K.G. Co., Ltd, type: PMS-20-25, and one extruder is available from PLA GIKEN Co., Ltd., type:PEX 20-24T, both are in Japan) with a die temperature of 230° C., a multi-laminated tube made of the basic material as the outer layer, BONDINETX-8030 (supra) as the intermedium layer and polyamide elastomer PAE 1200 (supra) as the innermost layer and having an inside diameter of 3 mm and outside diameter of 5 mm was obtained. The ratio of layers of the tube obtained was, from the innermost layer to out side, 2:1:3.

When this tube so obtained was used for a rabbit as an AV shunt between a carotid artery and a cervical vein, it was not found an inner occulusion of the tube used for about 24 hours duration without heparin.

Further, the tensile strength of the used tube was 18.6 kgf when tested for conditions of a speed of tensile strength at 200 mm/min and a tube length (from one attachment to another) of 20 mm.

EXAMPLE 21

The procedure of Example 20 was repeated, except that PEBAX 3533SA (a polyamide elastomer produced by Atochem and sold by TORAY Industries, Inc. in Japan) was used instead of PAE 1200 (supra), to obtain a laminated tube.

When this tube was used as the AV shunt like Example 20, it was not found an inner occulusion of the tube used for about 30 hours. Further, the tensile strength of the used tube was 16.0 kgf.

EXAMPLE 22

The procedure of Example 20 was repeated, except that Hytrel 4047 (a polyester elastomer sold by Du Pont-Toray Co. Ltd. in Japan) was used instead of PAE 1200 (supra), to obtain a laminated tube.

When this tube was used as the AV shunt like Example 20, it was not found an inner occulusion of the tube used for about 20 hours. Further, the tensile strength of the used tube was 17.8 kgf.

EXAMPLE 23

The procedure of Example 20 was repeated, except that Miractran E-395 (a polyurethane elastomer sold by Nippon Miractran Company Ltd. in Japan) was used instead of PAE 1200 (supra), to obtain a laminated tube.

When this tube was used as the AV shunt like Example 20, it was not found an inner occulusion of the tube used for about 20 hours. Further, the tensile strength of the used tube was 15.8 kgf.

COMPARATIVE EXAMPLE 11

The procedure of Example 20 was repeated, except that a tube composed of a monolayer made of the base material in Example 20, was used instead of the laminated tube (composed of base material/BONDINE/PAE 1200).

When this tube was used as the AV shunt like Example 20, it was found no inner occulusion of the tube used for about 3 hours but an inner occulusion thereof due to blood coagulation. Further, the tensile strength of the used tube was 10.3 kgf.

COMPARATIVE EXAMPLE 12

The procedure of Example 20 was repeated, except that a tube composed of a monolayer of PAE 1200 (supra) was used.

When this tube was used as the AV shunt like Example 20, it was not found an inner occulusion of the tube used for about 24 hours. But, the tensile strength of the used tube was 9.8 kgf, which value is very poor for practical usage.

COMPARATIVE EXAMPLE 13

The procedure of Example 20 was repeated, except that a tube composed of a monolayer of PEBAX 3533SA (supra) was used.

When this tube was used as the AV shunt like Example 20, it was not found an inner occulusion of the tube used for about 30 hours. But, the tensile strength of the used tube was 7.8 kgf, which value is very poor for practical usage.

EXAMPLES 24–28

Each of multi-laminated tubes like that of Example 20 was obtained using the tube compositions shown in Table 7. The tests like Example 20 were performed and the test results are shown in Table 7.

TABLE 7

|  | Examples | | | | |
| --- | --- | --- | --- | --- | --- |
|  | 24 | 25 | 26 | 27 | 28 |
| Structure of laminates | | | | | |
| Second layer | | | | | |
| Q-1 | 80 | 40 | 70 | — | — |
| Q-2 | — | — | — | — | — |
| Q-3 | — | — | — | — | — |
| Q-4 | — | 30 | — | 70 | 90 |
| Q-5 | — | — | — | — | — |
| PP-1 | 20 | 30 | — | 30 | 10 |
| PP-2 | — | — | 30 | — | — |
| First layer | W-1 | W-1 | W-2 | W-2 | W-1 |
| Third layer | V-1 | V-1 | V-3 | V-2 | V-3 |
| Properties | | | | | |
| A-V shunt (hr) | 24 | 24 | 28 | 28 | 26 |
| Tensile break strength (kgf) | 27.6 | 25.6 | 27.7 | 30.2 | 28.2 |

What is claimed is:

1. A container for storing blood or a blood component, comprising a sheet material having a plurality of layers adhered to each other, said sheet material comprising:

an innermost layer, at least one portion of which is made of a block copolymer having a micro-phase separating structure, said block copolymer being at least one member selected from the group consisting of a polyamide elastomer, a polyester elastomer, a polyurethane elastomer, and a hydroxyethyl methacrylate-styrene block copolymer; and a second layer, positioned at the opposite side of said innermost layer to contact blood or blood components, being made of a thermoplastic resin composition containing 40 to 90% by weight of at least one member selected from a group consisting of hydrogenated diene copolymers (i), (ii) and (iii), and 60 to 10% by weight of a polyolefin resin, based on the weight of said thermoplastic resin composition;

said hydrogenated diene copolymer (i) being straight chained or branched, having a number average molecular weight of 50,000 to 300,000 and a first or second block copolymer having at least 80% of the double bonds of the conjugated diene portions being hydrogenated, said first block copolymer having one or more of the polymer units (A), (B) and (C), respectively, said polymer unit (A) containing more than 90% by weight of an aromatic vinyl compound, based on the weight of said polymer unit (A), said polymer unit (B) being a conjugated diene polymer or an aromatic vinyl compound-conjugated diene copolymer wherein the vinyl bonding rate is in the range of 30–90%, said polymer unit (C) being a polybutadiene polymer wherein the vinyl bonding rate is in the range of not more than 30%, the ratio of said polymer units (A), (B) and (C) being 3–30:40–80:10–40% by weight, providing the sum of said polymer units (A), (B) and (C) is 100%, and said second block copolymer being composed of said polymer units (A), (B) and (C) of said first block copolymer, and further containing a coupling agent residue between or at the terminal position thereof;

said hydrogenated diene copolymer (ii) being straight chained or branched, having a number average molecular weight of 50,000 to 400,000 and a third or fourth block copolymer having at least 80% of the double bonds of the conjugated diene portions being hydrogenated, said third block copolymer being represented by any one of the following formulae:

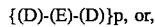

{(D)-(E)-(D)}p, or,

{(D)-(E)}p wherein polymer unit (D) is a polybutadiene polymer having a vinyl bonding rate of not more than 20%, and polymer unit (E) is a conjugated diene polymer or an aromatic vinyl compound-conjugated diene copolymer wherein the vinyl bonding rate is in the range of 30–90% and p is an integer of more than 1, and said fourth block copolymer being composed of said polymer units (D) and (E) of said third block copolymer, and further containing a coupling agent residue between or at the terminal position thereof; and said fifth copolymer being represented by the following formula:

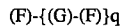

(F)-{(G)-(F)}q wherein (F) is a polymer unit made of more than 90% by weight of an aromatic vinyl compound, (G) is a polymer unit made of a conjugated diene wherein a vinyl bonding rate is 30–90%, and q is an integer of more than 1, and said sixth block copolymer being composed of said polymer units (F) and (G), and further containing a coupling agent residue between or at the terminal position thereof.

2. A container according to claim 1 further comprising a third layer to adhere said first and said second layers.

3. A container for storing blood or blood component, comprising a sheet material having a plurality of layers and wherein said layers are adhered to each other, said sheet material comprising:

an innermost layer, at least a portion of which is made of a polyamide elastomer having a micro-phase separating structure; and a second layer, positioned at the opposite side of said innermost layer to contact blood or blood components, being made of a thermoplastic resin composition containing 40 to 90% by weight of a hydrogenated diene copolymer (i) and 60 to 10% by weight of a polyolefin resin, based on the weight of said thermoplastic resin composition, said hydrogenated diene copolymer (i) being straight chained or branched, having a number average molecular weight of 50,000 to 300,000, and a first block copolymer having at least 80% of the double bonds of the conjugated diene portions being hydrogenated, said first block copolymer composed of, % by weight, 3–30 of a polymer unit (A), 40–80 of a polymer unit (B) and 10–40 of a polymer unit (C), providing the sum of said polymer units (A), (B) and (C) is 100%, said polymer unit (A) containing more than 90% by weight of an aromatic vinyl compound as a monomer unit, based on the weight of said polymer unit (A), said polymer unit (B) being a conjugated diene copolymer or an aromatic vinyl compound-conjugated diene copolymer wherein a vinyl bonding rate is in the range of 30–90%, said polymer unit (C) being a polybutadiene polymer wherein the vinyl bonding rate is in the range of not more than 30%.

4. A container according to claim 3, wherein said polyamide elastomer consists of a crystalline hard segment having a relatively high melting point and an amorphous soft segment having a relatively low glass transition point, said hard segment comprising a polyamide having a number average molecular weight of 300–15,000, and said soft segment comprising a polyalkylene glycol having a number average molecular weight of 200–6,000.

5. A container according to claim 4, wherein said polyamide is made of an amino acid or a lactam, or a mixture of a condensation product of a first dicarboxylic acid and a diamine and a second dicarboxylic acid, said polyamide having carboxylic groups at the terminals.

6. A container according to claim 4, wherein said polyalkylene glycol comprises polyethylene glycol, polypropylene glycol, polytetramethylene glycol, or polyethylene glycol-polypropylene glycol copolymer or a mixture thereof.

7. A container according to claim 5, wherein said lactam comprises capro lactam or lauryl lactam.

8. A container according to claim 5, wherein said amino acid comprises 11-amino-undecanoic acid or 12-aminododecanoic acid.

9. A container according to claim 5, wherein said first dicarboxylic acid is adipic acid and said diamine is hexamethylene diamine.

10. A container according to claim 3, wherein said vinyl compound comprises styrene, t-butyl styrene, a-methylstyrene, p-methyl styrene, divinylbenzene, 1,1-diphenyl styrene, N,N-dimethy-p-aminoethyl styrene, N,N-diethyl-p-aminoethyl styrene, or vinyl pyridine or a mixture thereof.

11. A container according to claim 10, wherein said vinyl compound is styrene or a-methylstyrene.

12. A container according to claim 3, wherein the conjugated diene for said hydrogenated diene copolymer (i) comprises 1,3-butadiene, isoprene, 2,3-dimethyl-1,3-butadiene, 1,3-pentadiene, 2-methyl-1,3-pentadiene, 1,3-hexadiene, 4,5-dimethyl-1,3-octadiene, 3-butyl-1,3-octadiene, or chloroprene or a mixture thereof.

13. A container according to claim 12, wherein said conjugated diene is 1,3-butadiene or isoprene.

14. A container according to claim 3, wherein said first block copolymer further comprises a coupling agent residue between or at the terminal thereof.

15. A container according to claim 14, wherein said coupling agent comprises diethyl adipate, divinylbenzene, tetrachlorosilicon, butyltrichlorosilicon, tetrachlorotin, butyltrichlorotin, dimethychlorosilicon, tetrachlorogermanium, 1, 2-dibromoethane, 1,4-chloromethylbenzene, bis-(trichlorosilyl) ethane, epoxy soybean oil, tolylene di-isocyanate, or 1, 2, 4-benzene triisocyanate or a mixture thereof.

16. A container according to claim 3, wherein said polyolefin resin, as a starting monomer, comprises ethylene, propylene, 1-butene, 1-pentene, 1-hexene, 4-methyl-1-pentene, 2-methyl-1-propene, 3-methyl- 1-pentene, or 5-methyl- 1-hexene or a mixture thereof.

17. A container according to claim 16, wherein said starting monomer is ethylene or propylene.

18. A container according to claim 3, wherein said hydrogenated diene copolymer (i) further incorporates a hydrogenated diene copolymer (ii), said hydrogenated diene copolymer (ii) being straight chained or branched, having a number average molecular weight of 50,000 to 400,000, and at least 80% of the double bonds of the conjugated diene portions of a third block copolymer being hydrogenated, said third copolymer being represented by either of the following formulas:

$$\{(D)\text{-}(E)\text{-}(D)\}p, \text{ or,}$$

$$\{(D)\text{-}(E)\}p$$

wherein polymer unit (D) is a polybutadiene polymer having a vinyl bonding rate of not more than 20%, and polymer unit (E) is a conjugated diene polymer or an aromatic vinyl compound-conjugated diene copolymer wherein the vinyl bonding rate is in the range of 30–90% , and p is an integer of more than 1.

19. A container according to claim 18, wherein the ratio of said polymer unit (D) to said polymer unit (E) is 5–90:95–10% by weight.

20. A container according to claim 18, wherein the amount of said aromatic vinyl compound is not more than 35% by weight, based on the total weight of monomer to be used for said polymer unit (E).

21. A container according to claim 18, wherein said third block copolymer further comprises a coupling agent residue at the terminal or among therein.

22. A container according to claim 21, wherein said coupling agent comprises diethyl adipate, divinylbenzene, tetrachlorosilicon, butyltrichlorosilicon, tetrachlorotin, butyltrichlorotin, dimethychlorosilicon, tetrachlorogermanium, 1, 2-dibromoethane, 1,4-chloromethylbenzene, bis-(trichlorosilyl) ethane, epoxy soyabean oil, tolylene diisocyanate, or 1, 2, 4-benzene triisocyanate or a mixture thereof.

23. A container according to claim 3 further comprising a third layer between said first and said second layer to adhere both layers, said third layer being made of a functional group-containing polyolefin.

24. A container according to claim 23, wherein said functional group comprises maleic acid, fumaric acid, itaconic acid, citraconic acid, allysuccinic acid, nadic acid, methylnadic acid, maleic anhydride, fumaric anhydride, or itaconic anhydride or a mixture thereof.

25. A container according to claim 24 wherein said functional group is maleic anhydride.

26. A container according to claim 23, wherein said polyolefin comprises a resin made of a-olefin or rubber.

27. A container according to claim 26, wherein said polyolefin comprises a resin made of ethylene, propylene, 1-butene, 4-methyl-1-butene, or 4-methyl-1-pentene or a mixture thereof.

28. A container according to claim 27, wherein said polyolefin comprises a resin made of ethylene or propylene.

29. A container for storing blood or a blood component, comprising a sheet material having a plurality of layers and wherein said layers are adhered to one other, said sheet material comprising:

an innermost layer, at least one portion of which is made of a polyamide elastomer having a micro-phase separating structure; and a second layer, positioned at the opposite side of said innermost layer to contact blood or blood components, said second layer being made of a thermoplastic resin composition containing 40 to 90% by weight of a hydrogenated diene copolymer (ii), and 60 to 10% by weight of a polyolefin resin, based on the weight of said thermoplastic resin composition, said hydrogenated diene copolymer (ii) being straight chained or branched, having a number average molecular weight of 50,000 to 400,000 and having a third or fourth block copolymer having at least 80% of the double bonds of conjugated diene portions being hydrogenated, said third block copolymer being represented by any one of the following formulae:

{(D)-(E)-(D)}p, or,

{(D)-(E)}p wherein polymer unit (D) is a polybutadiene polymer having a vinyl bonding rate of not more than 20%, and polymer unit (E) is a conjugated diene polymer or an aromatic vinyl compound-conjugated diene copolymer wherein the vinyl bonding rate is in the range of 30–90% and p is an integer of more than 1, and a fourth block copolymer being composed of said polymer units (D) and (E) of said third block copolymer, and further containing a coupling agent residue between or at the terminal position thereof.

30. A container according to claim 29, wherein said polyamide elastomer is composed of a crystalline hard segment having a relatively high melting point and an amorphous soft segment having a relatively low glass transition point, said hard segment comprising a polyamide having a number average molecular weight of 300–15,000, and said soft segment comprising a polyalkylene glycol having a number average molecular weight of 200–6,000.

31. A container according to claim 30, wherein said polyamide comprises a reaction product of an amino acid itself, a lactam itself, or a first dicarboxylic acid and a diamine, said reaction product having a second carboxylic group at the terminal end.

32. A container according to claim 30, wherein said polyalkylene glycol comprises polyethylene glycol, polypropylene glycol, polytetramethylene glycol, or polyethylene glycol-polypropylene glycol copolymer or a mixture thereof.

33. A container according to claim 31, wherein said lactam comprises capro lactam or lauryl lactam.

34. A container according to claim 31, wherein said amino acid comprises 11-amino-undecanoic acid or 12-aminododecanoic acid.

35. A container according to claim 31, wherein said first dicarboxylic acid is adipic acid and said diamine is hexamethylene diamine.

36. A container according to claim 29, wherein said vinyl compound comprises styrene, t-butyl styrene, a-methylstyrene, p-methyl styrene, divinylbenzene, 1,1-diphenyl styrene, N,N-dimethyl-p-aminoethyl styrene, N,N-diethyl-p-aminoethyl styrene, or vinyl pyridine or a mixture thereof.

37. A container according to claim 36, wherein said vinyl compound is styrene or a-methylstyrene.

38. A container according to claim 29, wherein the conjugated diene for said hydrogenated diene copolymer (i) comprises 1,3-butadiene, isoprene, 2,3-dimethyl-1,3-butadiene, 1,3-pentadiene, 2-methyl-1,3-pentadiene, 1,3-hexadiene, 4,5-dimethyl-1,3-octadiene, 3-butyl-1,3-octadiene, or chloroprene or a mixture thereof.

39. A container according to claim 38, wherein said conjugated diene is 1,3-butadiene or isoprene.

40. A container according to claim 29, wherein said first block copolymer further comprises a coupling agent residue between or at the terminal thereof.

41. A container according to claim 40, wherein said coupling agent comprises diethyl adipate, divinylbenzene, tetrachlorosilicon, butyltrichlorosilicon, tetrachlorotin, butyltrichlorotin, dimethychlorosilicon, tetrachlorogermanium, 1, 2-dibromoethane, 1,4-chloromethylbenzene, bis-(trichlorosilyl) ethane, epoxy soybean oil, tolylene di-isocyanate, or 1, 2, 4-benzene triisocyanate or a mixture thereof.

42. A container according to claim 29, wherein said polyolefin resin, as starting monomer, comprises ethylene, propylene, 1-butene, 1-pentene, 1-hexene, 4-methyl-1-pentene, 2-methyl-1-propene, 3-methyl-1-pentene, or 5-methyl-1-hexene or a mixture thereof.

43. A container according to claim 42, wherein said starting monomer is ethylene or propylene.

44. A tube for transfusing blood or a blood component, comprising a tube material having a plurality of layers adhered to each other, said tube material comprising:

an innermost layer, at least one portion of which is made of a block copolymer having a micro-phase separating structure, said block copolymer being at least one member selected from the group consisting of a polyamide elastomer, a polyester elastomer, a polyurethane elastomer, and a hydroxyethyl methacrylate-styrene block copolymer; and a second layer, positioned at the opposite side of said innermost layer to contact blood or blood components, being made of a thermoplastic resin composition containing 40 to 90% by weight of at least one member selected from the a group consisting of hydrogenated diene copolymers (i), (ii) and (iii), and 60 to 10% by weight of a polyolefin resin, based on the weight of said thermoplastic resin composition;

said hydrogenated diene copolymer (i) being straight chained or branched, having a number average molecular weight of 50,000 to 300,000 and a first or second block copolymer having at least 80% of the double bonds of the conjugated diene portions being hydrogenated, said first block copolymer having one or more of the polymer units (A), (B) and (C), respectively, said polymer unit (A) containing more than 90% by weight of an aromatic vinyl compound, based on the weight of said polymer unit (A), said polymer unit (B) being a conjugated diene polymer or an aromatic vinyl compound-conjugated diene copolymer wherein the vinyl bonding rate is in the range of 30–90% said polymer unit (C) being a polybutadiene polymer wherein the vinyl bonding rate is in the range of not more than 30%, the ratio of said polymer units (A), (B) and (C) being 3–30:40–80:10–40% by weight, provided the sum of said polymer units (A), (B) and (C) is 100%, and said second block copolymer being composed of said polymer units (A), (B) and (C) of said first block copolymer, and further containing a coupling agent residue between or at the terminal position thereof;

said hydrogenated diene copolymer (ii) being straight chained or branched, having a number average molecular weight of 50,000 to 400,000 and a third or fourth block copolymer having at least 80% of the double bonds of the conjugated diene portions being hydrogenated, said third block copolymer being represented by any one of the following formulae:

{(D)-(E)-(D)}p, or

{(D)-(E)}p wherein polymer unit (D) is a polybutadiene polymer having a vinyl bonding rate of not more than 20%, and polymer unit (E) is a conjugated diene polymer or an aromatic vinyl compound-conjugated diene copolymer wherein the vinyl bonding rate is in the range of 30–90% and p is an integer of more than 1, and said fourth block copolymer being composed of said polymer units (D) and (E) of said third block copolymer, and further containing a coupling agent residue between or at the terminal position thereof; and said fifth copolymer being represented by the following formula:

(F)-{(G)-(F)}q wherein (F) is a polymer unit made of more than 90% by weight of an aromatic vinyl compound, (G) is a polymer unit made of a conjugated diene wherein a vinyl bonding rate is 30–90% and q is an integer of more than 1, and said sixth block copolymer being composed of said polymer units (F) and (G), and further containing a coupling agent residue between or at the terminal position thereof.

* * * * *

UNITED STATES PATENT AND TRADEMARK OFFICE
CERTIFICATE OF CORRECTION

PATENT NO. : 5,529,821
DATED : June 25, 1996
INVENTOR(S) : Kenji ISHIKAWA et al

It is certified that error appears in the above-indentified patent and that said Letters Patent is hereby corrected as shown below:

In Column 16, line 52, delete "300 mi" and insert -- 300 ml --.
In Column 16, line 64, delete "60 mi" and insert -- 60 ml --.
In Column 16, line 65, delete "pieces/mm 3" and insert -- pieces/mm$^3$ --.

Signed and Sealed this

Twenty-fifth Day of February, 1997

Attest:

BRUCE LEHMAN

Attesting Officer

Commissioner of Patents and Trademarks